United States Patent
Cho (10) Patent No.: US 7,561,373 B2
(45) Date of Patent: Jul. 14, 2009

(54) BIAS COMPENSATION METHOD AND APPROPRIATE BIAS FORCE PROFILE GENERATION METHOD, RECORDING MEDIA AND HARD DISK DRIVE

(75) Inventor: Hyung-joon Cho, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 187 days.

(21) Appl. No.: 11/401,336

(22) Filed: Apr. 11, 2006

(65) Prior Publication Data

US 2006/0268446 A1  Nov. 30, 2006

(30) Foreign Application Priority Data

May 28, 2005   (KR) .................. 10-2005-0045302

(51) Int. Cl.
G11B 5/596 (2006.01)
G11B 21/02 (2006.01)
G11B 5/03 (2006.01)
(52) U.S. Cl. .................. 360/78.04; 360/75; 360/66
(58) Field of Classification Search .................. None
See application file for complete search history.

(56) References Cited

U.S. PATENT DOCUMENTS

| 5,872,674 | A * | 2/1999 | Eddy .................. 360/78.09 |
| 7,253,989 | B1 * | 8/2007 | Lau et al. .................. 360/78.04 |
| 2001/0030826 | A1 * | 10/2001 | Thia et al. .................. 360/69 |
| 2005/0105207 | A1 * | 5/2005 | Park .................. 360/78.04 |

FOREIGN PATENT DOCUMENTS

| JP | 04-339371 | 11/1992 |
| JP | 06-020408 | 1/1994 |
| JP | 06-215508 | 8/1994 |
| KR | 10-2005-0029080 | 3/2005 |

OTHER PUBLICATIONS

Korean Officee Action issued on Sep. 21, 2006 with respect to Korean Application No. 10-2005-0045302, which corresponds to the above-referenced application.

* cited by examiner

Primary Examiner—Andrew L Sniezek
(74) Attorney, Agent, or Firm—Staas & Halsey LLP (57) ABSTRACT

Provided is a method of compensating for a bias for efficient servo control of a hard disk drive, and optimally compensating for bias force based on the elapsed usage time of a hard disk drive, and a bias force profile generation method, recording media, and a hard disk drive appropriate to the bias compensation method. The bias compensation method for compensating for a bias force applied to a magnetic head of a hard disk drive includes: measuring the bias force at the current position of a head; selecting a bias force profile having a bias force similar to the bias force measured at the current position of the head, from among a plurality of bias force profiles that are obtained by measuring bias forces of a disc from based on the elapsed usage time of the hard disk drive; and compensating for the bias force according to the selected bias force profile. According to the bias force compensation method, a plurality of bias force profiles based on the elapsed usage time of the hard disk drive are generated, and by selecting an optimum bias force profile from among the stored profiles, bias compensation can be performed accurately and quickly.

20 Claims, 5 Drawing Sheets

BIAS COMPENSATION METHOD AND APPROPRIATE BIAS FORCE PROFILE GENERATION METHOD, RECORDING MEDIA AND HARD DISK DRIVE

CROSS-REFERENCE TO RELATED APPLICATION

This application claims the benefit of Korean Patent Application No. 10-2005-0045302, filed on May 28, 2005, in the Korean Intellectual Property Office, the disclosure of which is incorporated herein in its entirety by reference.

BACKGROUND OF THE INVENTION

1. Field of the Invention

The present invention relates to a method of compensating for a bias for efficient servo control of a hard disk drive, and, more particularly, to a bias compensation method of optimally compensating for a bias force with respect to elapsed usage time of a hard disk drive, and a bias force profile generation method, recording media, and a hard disk drive which is appropriate to the bias compensation method.

2. Description of the Related Art

Generally, a hard disk drive is an apparatus for magnetically storing data on a rotating magnetic disk. Because of its large capacity and high speed, it is widely used as an auxiliary memory device of a computer system.

In the hard disk drive, data is stored in tracks formed as concentric circles on a magnetic disk. These tracks are accessed by a magnetic head that reads data from and writes data to the magnetic disk. Moving the magnetic head over the magnetic disk to one of the tracks is referred to as track seek.

A disturbance acting on the magnetic head during the track seek of the hard disk drive is referred to as a bias. In an HDD, major factors which affect the bias force include a pressure difference occurring when an air flow generated by the rotation of the disk pushes sides of the head, a tension of a flexible cable connected to the head, the characteristics of a bearing axis of a voice coil motor, etc. Accordingly, this bias force varies with respect to the position, the movement distance and the movement direction of the magnetic head. More specifically, the initial driving power of the voice coil varies with respect to the position and movement direction of the magnetic head and the initial movement speed of the magnetic head varies with respect to the movement distance in a seek operation. Accordingly, bias should be compensated with respect to the position, the movement distance, and the movement direction of the magnetic head. This bias force compensation method is disclosed in Japanese Patent Application Laid-Open Nos. Hei 6-215508, Hei 4-339371, and Hei 6-20408, etc.

According to the conventional bias force compensation method, a surface of a disk is divided into a plurality of areas ranging from its inner circumference to its outer circumference, and the bias force in each area is measured and stored in a bias compensation table. Then, the bias compensation table is referred to for bias compensation on a track seek operation.

However, a bias force can vary with respect to user environments. Accordingly, in actual practice, it is widely adopted that if the difference between the measured bias force according to the positions of the head and the bias force of the corresponding head position stored in the bias force table is considerably large, then the bias forces in that vicinity of the corresponding head position or in all areas in the bias force table are updated.

However, if only the bias forces in that vicinity are updated, since the remaining areas keep the previous bias forces without change, a deviation between bias forces in adjacent areas becomes larger.

Meanwhile, if the bias forces of all areas are updated, it is difficult to calculate a new adequate bias force for each area, and the calculation takes [too] much time. Further, assuming that the bias forces change non-linearly, because it needs to adapt a proportional constant with respect to the position of the head on the disk, the calculation takes quite a lot of time.

SUMMARY OF THE INVENTION

Additional aspects and/or advantages of the invention will be set forth in part in the description which follows and, in part, will be apparent from the description, or may be learned by practice of the invention.

An aspect of the present invention is to provide a bias compensation method for optimally compensating for a bias force with respect to an elapsed usage time of a hard disk drive.

Another aspect is to provide a bias force profile generation method for a hard disk drive appropriate to the bias compensation method.

A further aspect is to provide computer readable recording media storing programs to execute the above methods.

An additional aspect is to provide a hard disk drive appropriate to the bias force compensation method.

According to an aspect of the present invention, there is provided a bias compensation method for compensating for a bias force applied to a magnetic head of a hard disk drive, the method including: measuring the bias force at the current position of a head; selecting a bias force profile having a bias force most similar to the bias force measured at the current position of the head, from among a plurality of bias force profiles that are obtained by measuring bias forces of a disc from its inner circumference to its outer circumference and generated with respect to the elapsed usage time of the hard disk drive; and compensating for the bias force according to the selected bias force profile.

According to another aspect of the present invention, there is provided a bias force profile generation method for generating a bias force profile for compensating for a bias force applied to a head, the method including: generating a bias force profile by measuring a bias force with respect to the position of a head of a hard disk drive by continuously moving the head from the inner circumference to the outer circumference of a disk; generating n bias force profiles by repeatedly performing the bias force profile generation n times at predetermined time intervals with respect to the elapsed usage time of the hard disk drive; and storing the n bias force profiles in a recording area that is accessed by the hard disk drive.

According to still another aspect of the present invention, there is provided a computer readable recording medium having embodied thereon a computer program for executing a bias compensation method for compensating for a bias force applied to a magnetic head of a hard disk drive, wherein the bias compensation method includes: measuring the bias force at the current position of a head; selecting a bias force profile having a bias force most similar to the bias force measured at the current position of the head, from among a plurality of bias force profiles that are obtained by measuring bias forces of a disc from its inner circumference to its outer circumference and generated with respect to the elapsed usage time of the hard disk drive; and compensating for a bias force according to the selected bias force profile.

According to yet still another aspect of the present invention, there is provided a computer readable recording medium having embodied thereon a computer program for executing a bias force profile generation method for generating a bias force profile for compensating for a bias force applied to a head, wherein the bias force profile generation method includes: generating a bias force profile by measuring a bias force with respect to the position of a head of a hard disk drive by continuously moving the head from the inner circumference to the outer circumference of a disk; generating n bias force profiles by repeatedly performing the bias force profile generation n times at predetermined time intervals with respect to the elapsed usage time of the hard disk drive; and storing the n bias force profiles in a recording area that is accessed by the hard disk drive.

According to a further aspect of the present invention, there is provided a hard disk drive including: a disk which stores information; a spindle motor which rotates the disk; a head which writes information to and reads information from the disk; a voice coil motor which moves the head; a memory which stores a bias force profile for compensating for a bias force applied to the head; and a controller which measures a bias force in a track following operation, selects a bias force profile having a bias force most similar to the bias force measured at the current position of the head, from among a plurality of bias force profiles that are obtained by measuring bias forces of a disc from its inner circumference to its outer circumference and generated with respect to the elapsed usage time of the hard disk drive, updates the memory with the selected bias force profile, and compensates for a bias force according to the bias force profile stored in the memory in a track seek mode.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
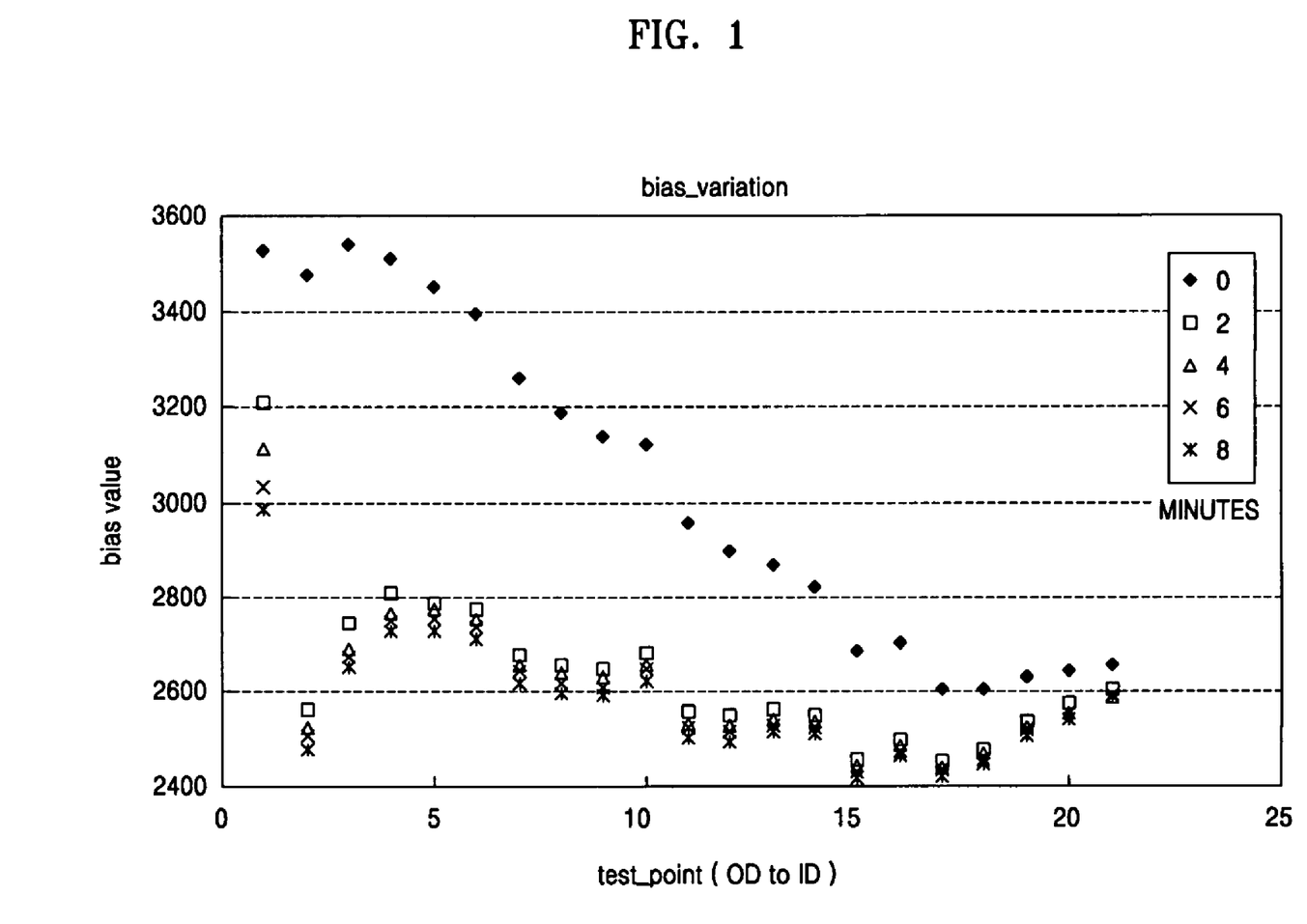
FIG. 1 illustrates bias force profiles generated by a bias force profile generation method according to an embodiment of the present invention.

FIG. 1 illustrates bias force profiles generated by a bias force profile generation method according to an embodiment of the present invention;

Referring to FIG. 1, the horizontal axis indicates the distance from the outer circumference to the inner circumference of the disk, and the vertical axis indicates the bias force. Thus a bias force profile shows the changes of the bias force with respect to the position of the head on the disk.

According to a bias force profile generation method of the present invention, a plurality of bias force profiles are made from the time when the hard disk drive begins to be used, that is, when data begins to be written or read as a track seek or track following operation is performed.

Each bias force profile has bias forces measured while moving the head (continuously) from the inner circumference to the outer circumference of the disk. A bias force is represented by a DC component of a driving current applied to a voice coil motor when the head follows a track.

The bias force profiles shown in FIG. 1 are prepared in the manufacturing process of the hard disk drive, preferably in a burn-in test process from the inner diameter (ID) to the outer diameter (OD). The bias force profiles are stored in a system area (maintenance area) of the disk, and referred to when compensation of a bias force is needed for example, in a track seek operation.

FIG. 1 shows 5 bias force profiles. Referring to FIG. 1, it can be seen that the bias force converges on a predetermined value as time elapses after the hard disk drive begins to be used. For example, from the bottom to the top on the left-hand side of FIG. 1 ♦, □, Δ, x, and * are shown, and these marks indicate values measured at the initial use time (0) of the hard disk drive and at 2 minutes, 4 minutes, 6 minutes and 8 minutes after the initial use time respectively. As can be seen, the bias force converges on *, that shows the best value[s] as time elapsed.

Accordingly, it can be learned that the bias force can be compensated for by selecting one of the bias force profiles shown in FIG. 1 by referring to the elapsed usage time after the hard disk drive began to be used.

However, in this bias force compensation method the elapsed time after the hard disk drive began to be used must be known at the time of bias compensation.

In order to detect this elapsed time, it is possible to use a timer, but this is not so efficient. This is because it is difficult to accurately calculate variables such as a pause time, the operation conditions of the hard disk drive, etc, which should be considered in determining the elapsed time.

In the present invention, a bias force profile to be used for bias force compensation is selected by a more practical way. More specifically, in the present invention, a bias force profile having a similar bias force to the actual bias force measured is selected.

This method is more effective when respective bias forces of bias profiles with respect to a head position are sufficiently separated from each other.

This method enables an optimum compensation of bias force not only with respect to the elapsed usage time of the hard disk drive but also with respect to other variables for example, operation temperature, humidity, atmospheric pressure, etc.

According to experiment results, if there are about 5 bias force profiles measured at intervals of 2 minutes, then the bias force can be substantially compensated for.

Figure 2:
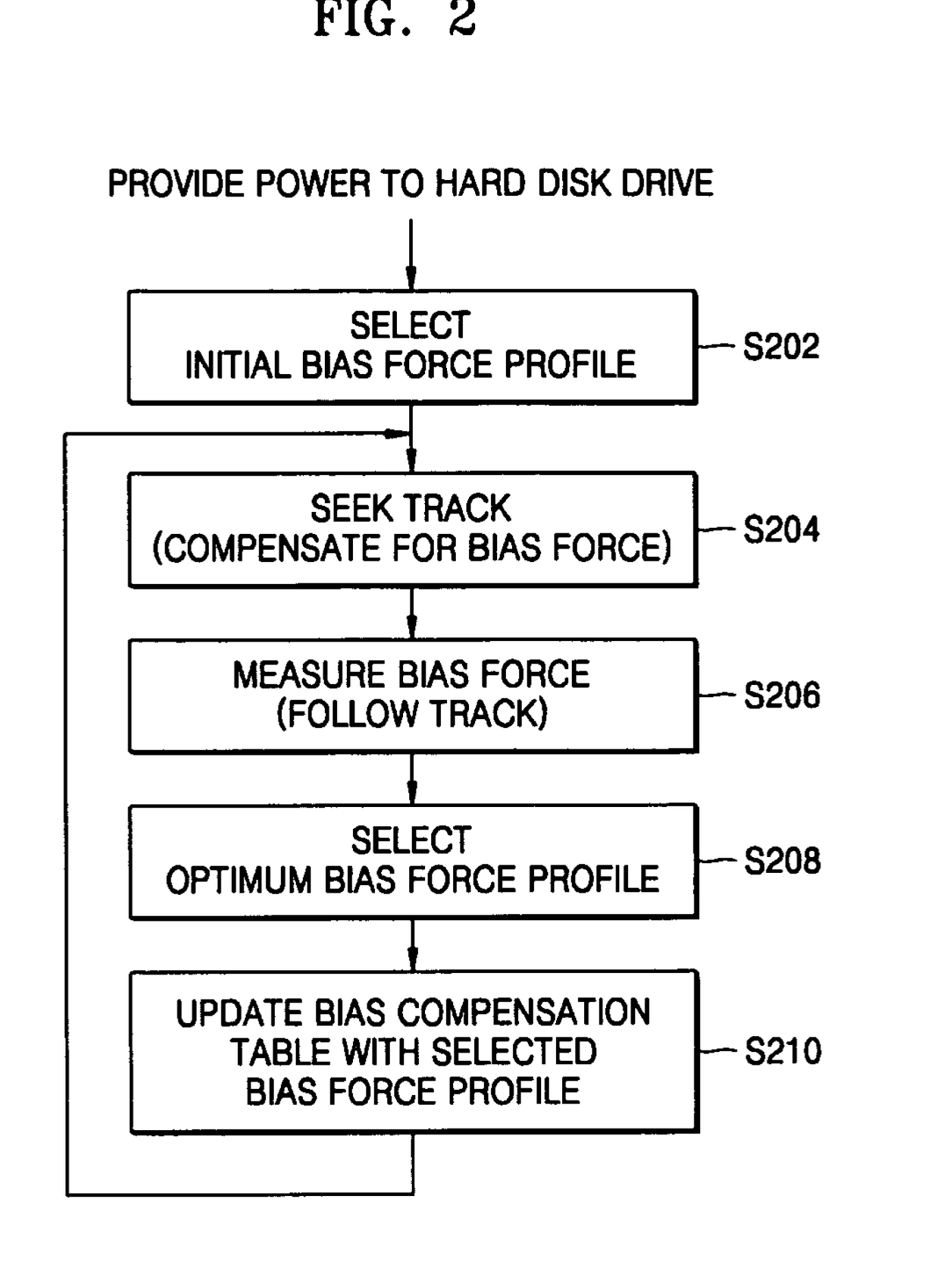
FIG. 2 is a flowchart of the operations performed by a bias force compensation method according to an embodiment of the present invention.

FIG. 2 is a flowchart of the operations performed by a bias force compensation method according to an embodiment of the present invention.

It is assumed that bias force profiles for bias force compensating as shown in FIG. 1 are prepared beforehand. The bias force profiles for bias force compensating as shown in FIG. 1 are stored in a system area of a hard disk drive or a non-volatile memory.

First, if power is provided to a hard disk drive, a bias force profile to be used for bias force compensating in the initial stage of usage is selected, and stored in a bias force compensation table in operation S202.

If power is provided to the hard disk drive, a controller (not shown) reads a bias force profile corresponding to initial use from among the prepared bias force profiles, for example, that marked with ♦ in FIG. 1, and stores it in preparation for bias force compensation afterward.

Track seek is performed in operation S204. The track seek operation is performed together with a bias force compensation, and the bias force compensation is performed by using the bias force profile stored in the bias force compensation table.

The bias force is measured in operation S206. The bias force is measured when the track seek operation is finished and a track following operation is performed. The bias force is detected with the DC component of a voice coil motor driving current.

An optimum bias force profile, which has a bias force equal to that measured, with respect to the position of the head on the disk, is selected in operation S208.

It is assumed that A, B, C, and D are respectively the measured bias force, a bias force of the bias force profile being used for a bias force compensation (the current bias force profile), a bias force of a bias force profile at a time before the current bias force profile, and a bias force of a bias force profile at a time after the current bias force profile. Here, the bias force profiles before and after the current profile can be easily understood by considering that in the bias force profile generation method according to the present invention, bias force profiles are generated at predetermined time interval from the time when the hard disk drive begins to be used. For example, if the current bias force profile is that marked with □ of FIG. 1, the bias force profiles before and after the current profile are those marked with ♦ and Δ, respectively.

A bias force profile to use is selected as follows.

If |A−B|<|A−C| & |A−B|<|A−D|, then maintain the current bias force profile.

If |A−C|<|A−B| & |A−C|<|A−D|, then replace the current bias force profile with the bias force profile at a time after the current bias force profile.

If |A−D|<|A−C| & |A−D|<|A−B|, then replace the current bias force profile with the bias force profile at a time prior to the current bias force profile.

That is, by comparing the differences between the measured bias force and the bias forces of the current, before and after bias force profiles, the bias force profile having a bias force (most) similar or closest to the measured bias force is selected.

The selected bias force profile, the bias compensation table is updated in operation S210. The controller selects an optimum bias force profile having a bias force identical to the bias force measured, respect to the position of the head on the disk, from among the bias force profiles recorded in the system area of the disk, and updates the bias compensation table by the selected profile.

As the result, the bias compensation table has a bias force profile to be referred to in the next track seek operation.

In the bias force compensation method according to the present invention, measuring and updating of the bias force can be performed after a track seek is performed for more than a predetermined distance.

In the present invention, when a track seek operation is performed, bias compensation by referring to a bias force profile stored in the bias compensation table is performed, and in a track following operation after the track seek operation, an actual bias force is measured and the bias force profile to be used in next bias force compensation is updated.

Though selection of a bias force profile before track seek may be good, this is not desirable for maximizing the operation speed of the hard disk drive.

In the present invention, measuring of the bias force may be performed periodically at predetermined time intervals during a track following operation.

Figure 3:
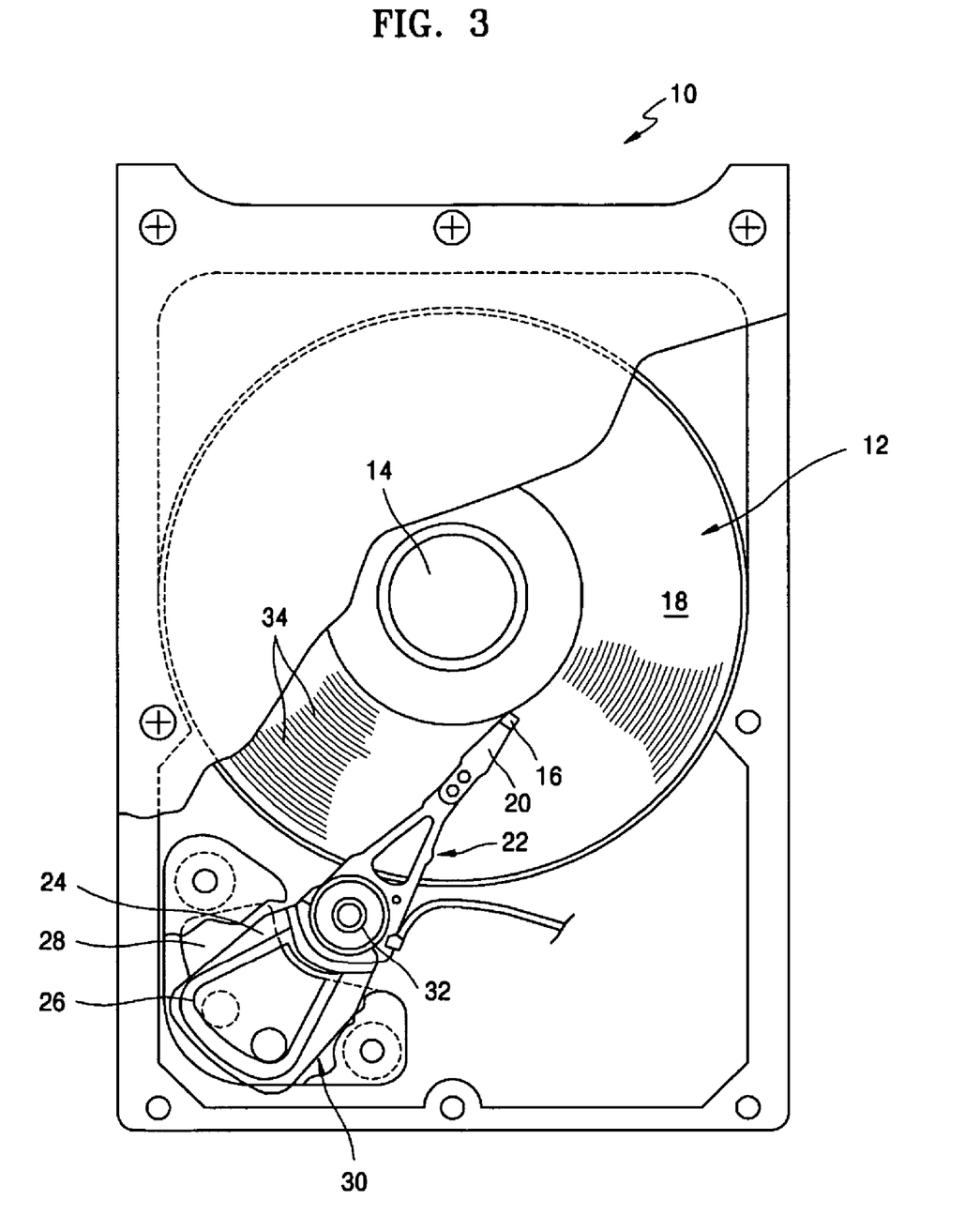
FIG. 3 illustrates the structure of a hard disk drive.

FIG. 3 illustrates the structure of a hard disk drive 10. The drive 10 includes at least one disk 12 rotated by a spindle motor 14. The drive 10 also includes a head 16 positioned close to the surface 18 of the disk 12.

The head 16 can read information from or write information to the rotating disk 12 by sensing a magnetic field of the disk 12 or magnetizing a part of the disk 12. Typically, the head 16 is coupled with one of the surfaces 18 of disk 12. Though a single head 16 is shown, this should be understood as including a recording head for magnetizing the disk 12 and a separate read head for sensing the magnetic field of the disk 12. The read head is made with a magneto-resistive (MR) element.

The head 16 can be integrated into a slider 20. The slider 20 has a structure for generating an air bearing between the head 16 and the surface of the disk 12. The slider 20 is coupled with a head gimbal assembly 22. The head gimbal assembly is attached to an actuator arm 24 having a voice coil 26. The voice coil 26 is located close to a magnetic assembly 28 defining a voice coil motor (VCM) 30. A current provided to the voice coil 26 generates torque that rotates the actuator arm 24 about the bearing assembly 32. The rotation of the actuator arm 24 moves the head 16 across the surface 18 of the disk 12.

Typically, information is stored in circular tracks 34 of the disk 12. Each track 34 generally includes a plurality of sectors. Each sector includes a data field and an identification field. The identification field is comprised of a gray code for identifying a sector and a track (cylinder). The head 16 moves across the surface 18 of the disk 12 in order to read information from or to write information to another track. An operation of moving the head across to another track is generally referred to a track seek routine.

Figure 4:
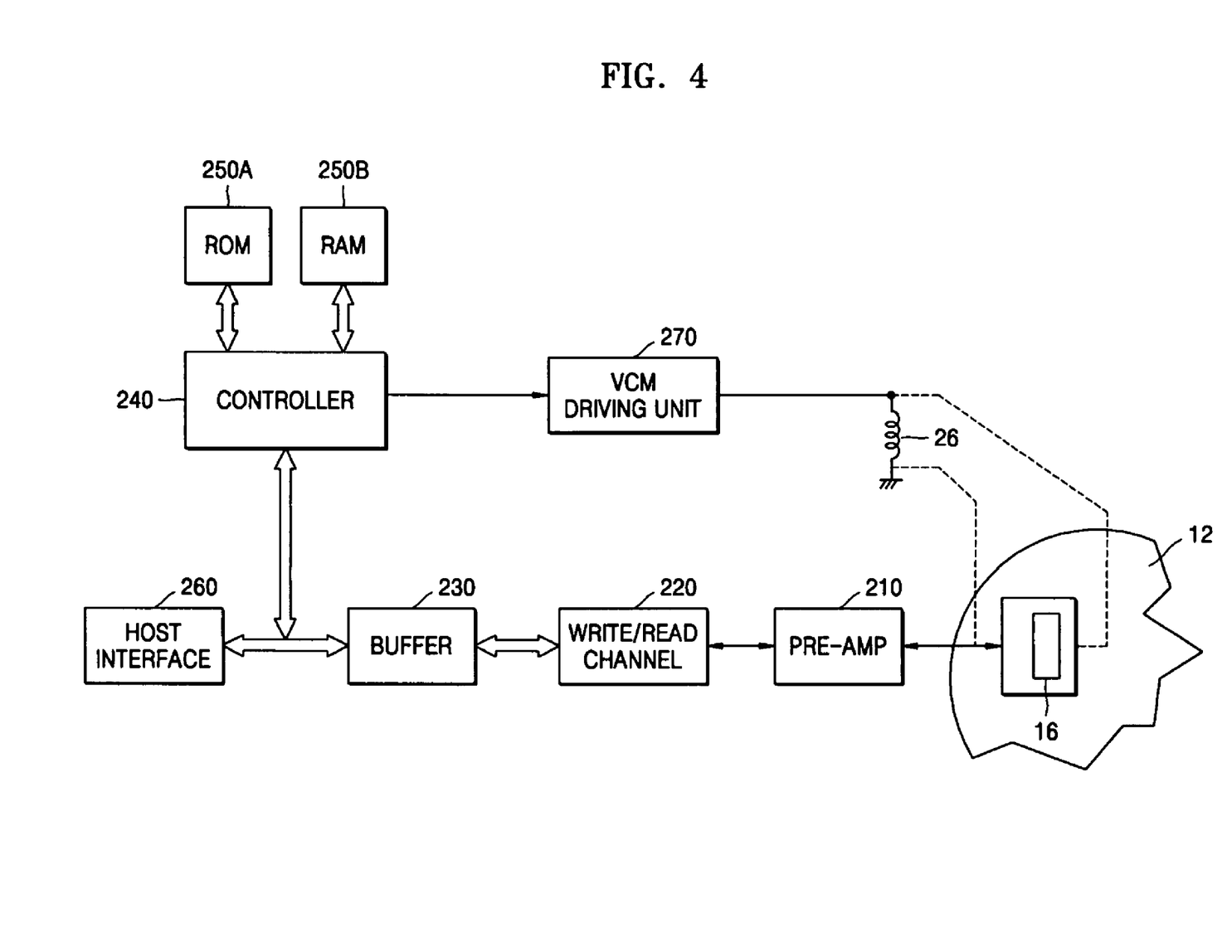
FIG. 4 illustrates the circuit structure of an apparatus shown in FIG. 3.
Figure 5:
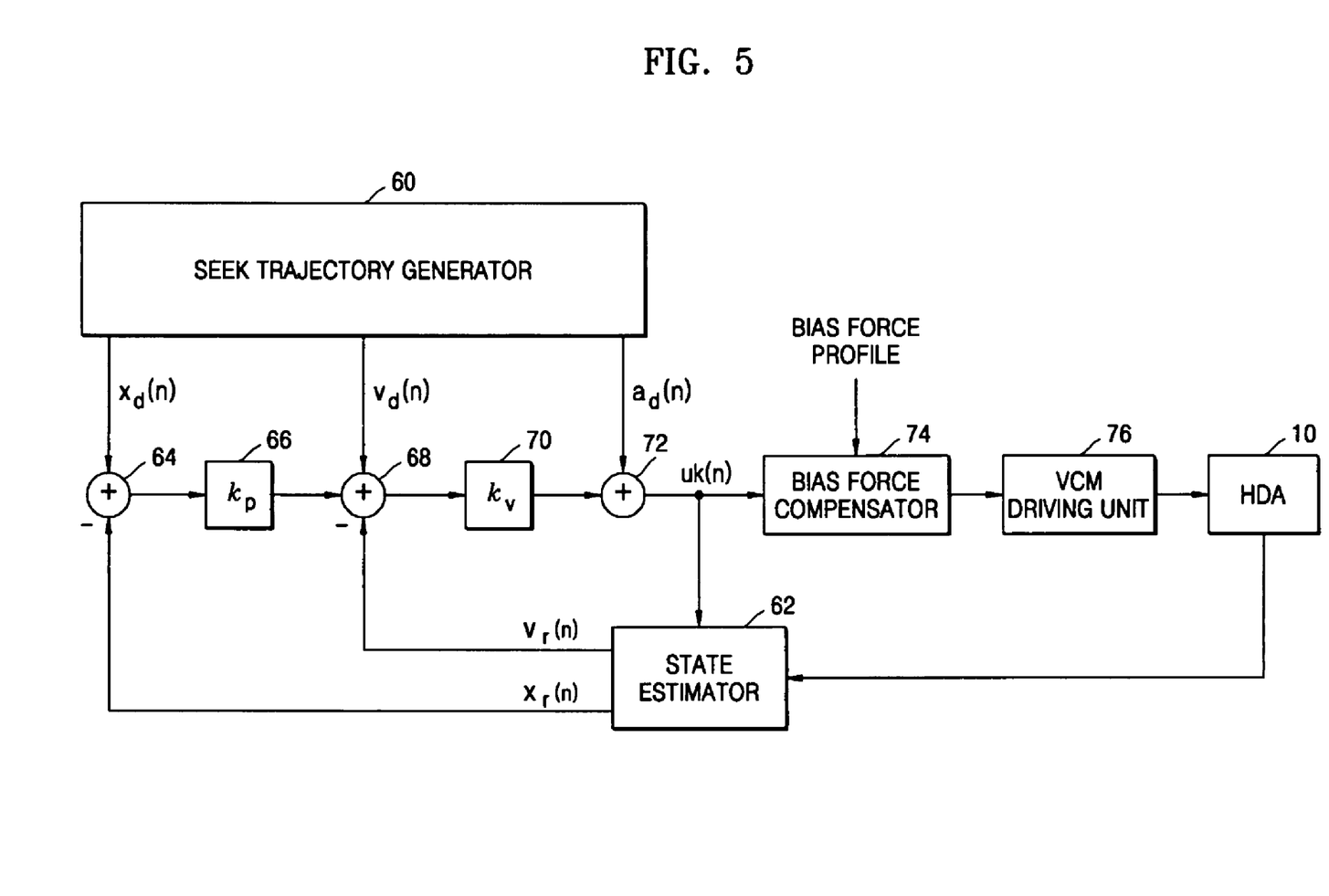
FIG. 5 illustrates a typical track seek servo control system implemented by a hardware and a software executed by a controller shown in FIG. 4.

FIG. 5 illustrates the circuit structure of the apparatus shown in FIG. 4. As shown in FIG. 5, the hard disk drive includes a disk 12, a magnetic head 16, a pre-amp 210, a write/read channel 220, a buffer 230, a controller 240, a ROM 250A, a RAM 250B, a host interface 260, and a voice coil motor (VCM) driving unit 270.

The ROM 250A stores a variety of commands and data to be used by the controller 240 in order to execute a software routine. One such software routine is a seek control routine for moving the head 16 from one track to another track while compensating for a bias force by referring to a bias force profile selected from among a plurality of bias force profiles generated considering the elapsed usage time of the hard disk drive. Also, as an embodiment, the ROM 250A stores equations for generating acceleration, velocity, and position trajectories of a sine waveform for track seek. Furthermore, the ROM 250A can also store a program for measuring the bias force when a track following operation is performed; selecting a bias force profile to be referred to when a track seek operation is performed, by comparing the measured bias force with a plurality of bias force profiles recorded in the system area of the disk; and storing the selected bias force profile in a bias compensation table for bias force compensation.

The RAM 250B stores information required for driving the hard disk drive, which is read from the ROM 250A or the disk 12 when the drive begins to operate. In particular, the RAM 250B stores bias force profiles to be referred to for bias force compensation when a track seek operation is performed in the form of a bias compensation table.

The controller 240 analyzes a command received from a host device (not shown) through the host interface 260, and performs control of the hard disk drive 40 corresponding to the analysis result. The controller 240 provides a control signal to the VCM driving circuit 270 in order to control the movement of the VCM and the magnetic head 16.

First, the normal operation of the hard disk drive will be explained.

In a data read mode, the hard disk drive first amplifies in the pre-amp 210 an electric signal sensed by the read head the magnetic head 16 from the disk 12. Then, in the write/read channel 220, a gain is controlled by an automatic gain control circuit (not shown), and the signal amplified in the pre-amp 210 is amplified to a predetermined level. The analog signal amplified to the predetermined level by the automatic gain control circuit is coded into a digital signal that can be read by the host device (not shown); converted into stream data; temporarily stored in the buffer 230; and then transmitted to the host device through the host interface 260.

Next, in a data write mode, the hard disk drive receives input data from the host device through the host interface 260; temporarily stores the data in the buffer 230; converts the data into a binary data stream appropriate to the write channel, by sequentially outputting the data stored in the buffer 230; and then sends a write current amplified by the pre-amp 210 to the disk 12 through the write head of the magnetic head 16.

Then, the track seek method performed in the controller 240 will be explained in detail.

In the track seek operation, the controller 240 calculates a seek time with respect to a seek length, generates acceleration, velocity, and position trajectories based on the calculated seek time, and executes a process of controlling the driving current of the voice coil motor. At this time, the controller 240 compensates for the driving current of the voice coil motor by referring to the bias force profile stored in the RAM 250B.

FIG. 5 illustrates a typical track seek servo control system implemented by a hardware and a software executed by the controller 240 shown in FIG. 4.

A seek trajectory generator 60 calculates the position $x_d(n)$, velocity $v_d(n)$, and design acceleration $a_d(n)$ of the head 16 from the sine wave acceleration trajectory and the velocity and position trajectories obtained by integrating the acceleration trajectory whenever the head 16 reads a gray code of the track 34.

The state estimator 62 performs a process for estimating a state variable value of the head motion including the actual position and actual velocity information of the head, by using a state equation from a position error signal and control signal uk that are being input.

A first adder 64 subtracts an actual position value $x_r(n)$ from a position value $x_d(n)$. A position control gain compensator 66 generates a position compensation value obtained by multiplying the difference of the position value and the actual position value calculated by the first adder 64, by the position gain ($k_p$) for position compensation.

Next, a second adder 68 adds a design velocity value $v_d(n)$ to the position compensation value generated by the position control gain compensator 66, and then subtracts an actual velocity value $v_r(n)$.

Then, a velocity control gain compensator 70 generates a velocity compensation value obtained by multiplying the value calculated by the second adder 68 by a velocity gain ($k_v$) for velocity compensation.

Next, a third adder 72 generates a seek driving current control value uk(n) by adding the velocity compensation value and the design acceleration value.

A bias force compensator 74 generates the seek driving current control value obtained by compensating for the bias force in the seek driving current control value uk(n) with respect to the position of the head 16 by referring to the bias force profile, and applies this to the VCM driver 76. Then, the VCM driver provides a current corresponding to the seek driving current control value in which the bias force is compensated for, to the voice coil of the head disk assembly 10 to rotate the voice coil motor and move the head 16.

The acceleration, velocity, position trajectories and current trajectory according to a seek servo algorithm of a sine waveform can be obtained from the following equation 1:

$$x(t) = K_A I_M \frac{T_{SK}}{2\pi}\left[t - \frac{T_{SK}}{2\pi}\sin\left(\frac{2\pi}{T_{SK}}t\right)\right]. \quad (1)$$

$$v(t) = K_A I_M \frac{T_{SK}}{2\pi}\left[1 - \cos\left(\frac{2\pi}{T_{SK}}t\right)\right]$$

$$a(t) K_A I_M \sin\left(\frac{2\pi}{T_{SK}}t\right)$$

$$i(t) I_M \sin\left(\frac{2\pi}{T_{SK}}t\right)$$

Here, $T_{SK}$ denotes a seek time, $I_M$ denotes a maximum current provided to the voice coil, and KA denotes an acceleration constant.

In relation to a given seek length ($X_{SK}$), a time (t) is identical to the seek time ($T_{SK}$) and their relationship is described by the following equation 2:

$$X_{SK} = x(T_{SK}) = K_A I_M \frac{T_{SK}^2}{2\pi} \quad (2)$$

From the equation 2, a seek time ($T_{SK}$) required for a given seek length ($X_{SK}$) can be obtained by using the following equation 3:

$$T_{SK} = \sqrt{\frac{2\pi X_{SK}}{K_A I_M}} \quad (3)$$

According to equation 3, it can be seen that a calculated seek trajectory of a sine waveform restricted by the current ($I_M$) applied to the voice coil motor is generated.

However, since the motion of the head 16 is actually disturbed by bias force acting on the head 16, it is necessary to compensate for the disturbance.

The controller 240 compensates for the current ($I_M$) applied to the voice coil motor by referring to the bias force profile stored in the RAM 250B.

For this, as described above with reference to the flowchart of FIG. 2, when power is applied to the hard disk drive, the controller 240 selects the bias force profile for an initial use of the hard disk drive, for example, that marked with ● in FIG. 1, from among a plurality of bias force profiles in the system area of the disk, and stores it in the RAM 250B.

After that time, the controller 240 detects the bias force at the current position on the disk using the DC component of the current ($I_M$) applied to the voice coil motor when a track following operation is performed. Once the bias force is detected, the controller 240 compares the measured bias force with the bias forces of the plurality of bias force profiles recorded in the system area of the disk, selects an optimum bias force profile, and replaces the bias force profile stored in the RAM 250B with the selected bias force profile.

If a track seek operation begins, the controller 240 compensates for the bias force by referring to the bias force profile stored in the RAM 250B.

In the bias force compensation method according to the present invention, bias force profiles are generated by referring to the elapsed usage time of the hard disk drive, but when these are used for actual compensation, one of them is selected by referring to a measured bias force. Accordingly, the present invention is robust against the influences of operation temperature, humidity, and atmospheric pressure, as well as the elapsed usage time of the hard disk drive.

For example, after a usage time of 2 minutes, if the operation temperature changes, the bias force profile indicated by ■ may not be appropriate. In the present invention, a bias force profile is not selected according to the elapsed usage time. Instead, according to the measured bias force, an optimum bias force profile is selected from among a plurality of bias force profiles prepared in advance and compensation is performed using the selected profile. Accordingly, comprehensive compensation can be performed in consideration of temperature, humidity, atmospheric pressure and the like.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

According to the bias force compensation method of the present invention as described above, a plurality of bias force profiles based on the elapsed usage time of the hard disk drive are generated, and by selecting an optimum bias force profile from among the profiles in order to compensate for a bias force, bias compensation can be performed accurately and quickly.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A bias compensation method for compensating for a bias force applied to a magnetic head of a hard disk drive, the method comprising:
   measuring a bias force at the current position of a head;
   selecting a bias force profile having a bias force similar to the bias force measured at the current position of the head, from among a plurality of bias force profiles that are obtained by measuring bias forces of a disc; and
   compensating for the bias force based on the selected bias force profile.

2. The method of claim 1, further comprising:
   selecting a bias force profile corresponding to an initial use of the hard disk drive if power is applied to the hard disk drive, from among the plurality of bias force profiles.

3. The method of claim 1, wherein the measuring of the bias force is performed in a track following operation.

4. The method of claim 3, wherein the measuring of the bias force is performed in a first track following operation after a track seek operation is completed.

5. The method of claim 4, wherein the track seek operation is performed for longer than a predetermined distance.

6. The method of claim 3, wherein the measuring of the bias force is performed periodically during a track following operation.

7. The method of claim 1, wherein the selecting of the bias force profile comprises:
   calculating the difference between the measured bias force and bias forces corresponding to the current position of the head in a bias force profile selected for bias force compensation, in a bias force profile from a time prior to the selected bias force profile, and in a bias force profile from a time after the selected bias force profile; and
   comparing the calculated differences and selecting the bias force profile having a bias force closest to the measured bias force.

8. The method of claim 1, the selected bias force profile is the most similar bias force profile to the bias force measured at the current position of the head.

9. The method of claim 1, the plurality of bias force profiles are obtained by measuring bias forces of a disc from its inner circumference to its outer circumference.

10. The method of claim 1, the plurality of bias forces profiles are obtained by measuring bias forces of a disc based on the elapsed usage time of the hard disc drive.

11. A bias force profile generation method for generating a bias force profile for compensating for a bias force applied to a head, the method comprising:
   generating a bias force profile by measuring a bias force with respect to the position of a head of a hard disk drive by moving the head from the inner circumference to the outer circumference of a disk;
   generating N bias force profiles by performing the bias force profile generation n times at predetermined time intervals based on elapsed usage time of the hard disk drive; and
   storing the N bias force profiles in a recording area.

12. The method of claim 11, wherein the bias force profiles are generated in a burn-in test process of the hard disk drive.

13. The method of claim 11, wherein the N is 5.

14. The method of claim 8, the predetermined time interval is about 2 minutes.

15. A computer readable recording medium having embodied thereon a computer program for executing a bias compensation method for compensating for a bias force applied to a magnetic head of a hard disk drive, wherein the bias compensation method comprises:
   measuring a bias force at the current position of a head;
   selecting a bias force profile having a bias force most similar to the bias force measured at the current position of the head, from among a plurality of bias force profiles that are obtained by measuring bias forces of a disc from its inner circumference to its outer circumference and generated based on the elapsed usage time of the hard disk drive; and
   compensating for the bias force according to the selected bias force profile.

16. A computer readable recording medium having embodied thereon a computer program for executing a bias force profile generation method for generating a bias force profile for compensating for a bias force applied to a head, wherein the bias force profile generation method comprises:

generating a bias force profile by measuring a bias force based on the position of a head of a hard disk drive by continuously moving the head from the inner circumference to the outer circumference of a disk;

generating n bias force profiles by repeatedly performing the bias force profile generation n times at predetermined time intervals based on the elapsed usage time of the hard disk drive; and storing the n bias force profiles in a recording area that is accessed by the hard disk drive.

17. A hard disk drive, comprising:

a disk that stores information;

a spindle motor that rotates the disk;

a head that writes information to and reads information from the disk;

a voice coil motor that moves the head;

a memory which stores a bias force profile for compensating for a bias force applied to the head; and a controller which measures a bias force in a track following operation, selects a bias force profile having a bias force similar to the bias force measured at the current position of the head, from among a plurality of bias force profiles that are obtained by measuring bias forces of a disc from its inner circumference to its outer circumference and generated with respect to the elapsed usage time of the hard disk drive, updates the memory with the selected bias force profile, and compensates for the bias force according to the bias force profile stored in the memory in a track seek mode.

18. A computer having a hard disc drive (HDD) having the method of claim 17.

19. A method as recited in claim 17, wherein the updating comprises:

selecting a bias force profile having a bias force profile having a bias force closest to the measured bias force; and updating the bias force compensation with the profile.

20. A method, comprising:

performing seeking to target tracks;

after each of the seeks, measuring a bias force of a corresponding target track; and after each measurement, updating a bias force compensation for the corresponding track, wherein the updating comprises;

selecting a bias force profile having a bias force closest to the measured bias force, from among a plurality of bias force profiles that are obtainced by measuring bias force of a disk; and updating the bias force compensation with the selected bias force profile.

* * * * *

UNITED STATES PATENT AND TRADEMARK OFFICE
CERTIFICATE OF CORRECTION

| | |
|---|---|
| PATENT NO. | : 7,561,373 B2 |
| APPLICATION NO. | : 11/401336 |
| DATED | : July 14, 2009 |
| INVENTOR(S) | : Hyung-joon Cho |

Page 1 of 1

It is certified that error appears in the above-identified patent and that said Letters Patent is hereby corrected as shown below:

First Page, Column 2 (Other Publications), Line 1, change "Officee" to --Office--.

Column 10, Line 46, change "claim 8," to --claim 11,--.

Column 12, Lines 4-5, change "having the method of claim 17." to --of claim 17.--.

Column 12, Line 6, change "A method" to --The hard disk drive--.

Column 12, Line 18, change "comprises;" to --comprises:--.

Column 12, Line 21, change "obtainced" to --obtained--.

Signed and Sealed this

Seventeenth Day of November, 2009

David J. Kappos
*Director of the United States Patent and Trademark Office*